Oct. 16, 1951     H. C. BRADLEY     2,571,672
SUPPORTING STRUCTURE FOR MACHINES
Filed July 14, 1948

Inventor:
Harl C. Bradley,
by  *Prowell P. Mack*
His Attorney.

Patented Oct. 16, 1951

2,571,672

UNITED STATES PATENT OFFICE 2,571,672

SUPPORTING STRUCTURE FOR MACHINES

Harl C. Bradley, Fort Wayne, Ind., assignor to General Electric Company, a corporation of New York Application July 14, 1948, Serial No. 38,669

9 Claims. (Cl. 308—132)

This invention relates to improved unit-type supporting and bearing constructions for rotating machines and more particularly to such constructions which permit operation of the machine in any position.

In the design of rotating equipment, it is frequently desirable to provide a machine having a single or unit-bearing construction. In such machines, for instance dynamoelectric machines of the fractional horsepower frame sizes, it is necessary to provide an unusually long bearing surface in order to secure adequate support for the rotating parts. Because of the length of the bearing in such unit-bearing applications, in order to secure proper lubrication, it is necessary to provide means for pumping the lubricant through the bearing. It is well known in the art to feed lubricant from a reservoir to the shaft by means of an absorbent wick and to then pump the lubricant through the bearing by means of spiral grooves on the shaft, the lubricant being returned to the reservoir by gravity. Such machines, however, have not been capable of operation or shipment in all positions since the machine must be operated so as to permit gravity return of the lubricant and shipped in a position which prevents escape of the lubricant into the interior of the machine.

An object of this invention is to provide an improved unit-type supporting and bearing construction for rotating machines.

Another object of this invention is to provide an improved unit-type supporting and bearing arrangement for rotating machines which permits operation and shipment of the machine in any position.

Further objects and advantages of this invention will become apparent and the invention will be better understood from the following description referring to the accompanying drawing. The features of novelty which characterize this invention will be pointed out with particularity in the claims annexed to and forming a part of this specification.

In accordance with this invention, there is provided a unit-bearing construction wherein lubricant is fed to the bearing from a reservoir by capillar action of a wick and then pumped back through the bearing into the reservoir by the action of pumping grooves on the shaft, gravity not being a component of the lubricant circulation cycle.

Figure 1:
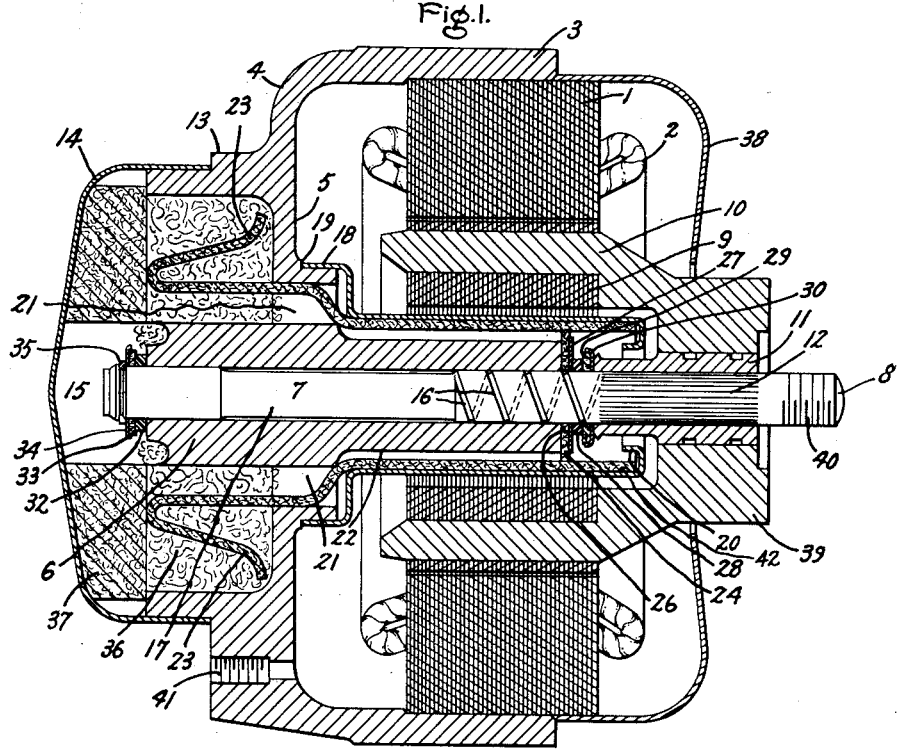
Figure 2:
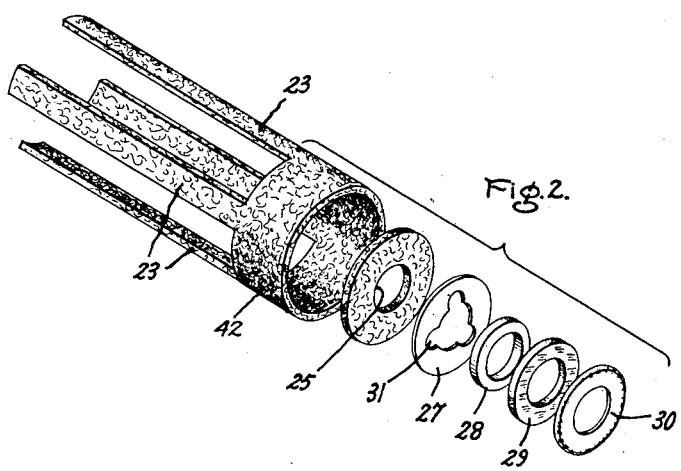

In the drawing, Fig. 1 is a side elevational view, partly in section, illustrating a unit-bearing motor having the improved supporting and bearing construction of this invention; and Fig. 2 is an exploded perspective view of the lubricating wick and thrust washer combination.

Referring now to the drawing, there is shown a motor having a stationary member provided with a core 1 formed of laminated magnetic material and a field exciting winding 2. The core 1 is mounted in a stationary frame 3, formed of cast iron or die cast aluminum, which extends as an end shield 4 at one end of the machine. The frame is provided with an outwardly extending web portion 5 formed integral with the end shield portion 4 and which has a bearing 6 secured thereto. The bearing 6 rotatably supports a shaft 7 which is provided with an extension 8 projecting beyond one end of the bearing. The motor is provided with a rotatable member having a core 9 formed of laminated magnetic material and a squirrel cage portion 10. The rotatable member is secured to a rotor sleeve portion 11 which in turn is mounted on the shaft extension 8 in any suitable manner, such as by knurling 12. The outwardly extending web portion 5 is provided with an annular flange portion 13 on its side remote from the shaft extension 8. A cover member 14 is secured to the free end of the annular flange portion 13 by means of a suitable groove formed therein. The cover member 14 forms with the flange portion 13 and the web portion 5 a lubricant retaining cavity or reservoir 15 at the end of the bearing 6 remote from the shaft extension 8.

As thus far described, the device of Fig. 1 is a conventional unit-bearing motor. In order to provide the proper lubrication for the bearing 6 which will permit the operation of the motor in any position, the arrangement now to be described is provided. Lubricant pumping grooves 16 are cut or otherwise formed on the shaft 7 adjacent the shaft extension 8 and an undercut portion 17 on the shaft effectively divides the journal surface of the shaft into two portions, thus providing two-point support of the shaft 7 by the bearing 6. A drawn metal retaining member 18 is secured to an annular portion 19 of the web 5 and surrounds the bearing 6 extending axially to also surround a portion of the shaft extension 8. This retaining member 18 is inturned as at 20 to form a re-entrant annular flange surrounding the rotor sleeve 11. A plurality of openings 21, are formed in the web portion 5 communicating with the cavity 15 and the space between the retaining member 18 and the outer surface 22 of the bearing 6. A wick of absorbent material comprising a plurality of axially extending leg portions 23, corresponding to the number of openings 21, with an annular ring portion 42 joining the legs, and a washer 24 fitted snugly within the ring portion, is utilized to transfer the lubricant from the cavity 15 to the bearing 6. The leg portions 23 project into the cavity 15 and extend respectively through the openings 21 in the web 5 and along the outer surface 22 of the bearing 6. The ring portion 42 extends into the re-entrant portion of the retaining member 18 and absorbs lubricant which may be thrown off by the cup washer 30, as will be hereinafter described. The shaft extension 8 projects through the central opening 25 of the washer 24 thus providing contact of the wick with the shaft and the pumping grooves 16 on the side of the bearing remote from the cavity 15. The washer 24 is held against the end shoulder 26 of the bearing 6 by a thrust combination including a spring steel washer 27, a fiber thrust washer 28, and a resilient washer 29 retained within a cup washer 30. The spring steel washer 27 prevents wearing of the washer 24 and is provided with a plurality of openings 31 which permits the washer 24 to lubricate the fiber thrust washer 28. The resilient washer 29 fits tightly on the shaft extension 8 and serves to prevent creepage of lubricant along the shaft. The cup washer 30 which supports the resilient washer 29 also acts as a lubricant thrower in case excessive lubricant is taken from the washer 24 by the thrust washer 28. The cup washer 30 throws this excess lubricant into the ring portion 42 of the wick thus preventing loss of lubricant. At the other end of the shaft 7, a fiber thrust washer 32, resilient washer 33 and supporting metal cup washer 34 are held in place by a snap ring 35 positioned in a groove at the end of the shaft. The end play of the rotor is adjusted by the proper selection of the thrust washers 28 and 32 at either ends of the bearing 6.

A quantity of lubricant absorbent material 36, such as wool packing or wool felts, is positioned in the cavity 15 adjacent the web portion 5 and serves to retain the lubricant and to contact the wick portions 23. A ring 37 of absorbent material such as felt packing is positioned between the cover member 14 and the packing material 35 and serves to keep the absorbent material 35 in contact with the wick portions 23. A suitable metal cover 38 is secured to the frame member 3 and surrounds the motor windings 2 and the hub portion 39 of the rotatable member. The shaft extension 8 projecting beyond the hub portion 38 of the rotatable member is adaptable for the transmission of power, for instance to operate a fan which can be secured to the shaft extension in any suitable manner, for instance as with threads 40. The machine may be supported in any convenient manner as by tapped openings 41 in the end shield portion 4.

In operation, lubricant such as oil or grease is introduced into the cavity 15 and is absorbed and retained by the absorbent material 36. The lubricant is picked up by the leg portions 23 of the wick and fed by capillary action to the shaft extension 8 at the end of the bearing 6 remote from the cavity 15. Here the lubricant is removed from the washer portion 24 of the wick by the pumping grooves 16 and is pumped axially along the shaft and through the bearing toward the cavity 15 to return the lubricant to the cavity and the absorbent material. While the lubricant absorbing material 36 and 37 is shown positioned in the cavity 15, it will be readily understood that grease alone can be introduced into the cavity and the absorbent material dispensed with.

It will now be readily apparent that there is here provided a unit-bearing of the sleeve type adapted for oil lubrication which permits operation of the machine in any position; since the lubricant is introduced to the bearing by capillary action of the wick and returned to the reservoir by the pumping action of the pumping grooves on the shaft, gravity not being a component of the lubricant distribution system. Thus, the motor of Fig. 1 can be operated in any position from the shaft extension vertically down to shaft extension vertically up. Furthermore, the motor can be stored and shipped in any position without danger of the lubricant leaking into the interior of the motor.

While there is illustrated and described a particular embodiment of this invention, modifications thereof will occur to those skilled in the art. I desire it to be understood, therefore, that this invention is not to be limited to the particular arrangement disclosed and I intend in the appended claims to cover all modifications which do not depart from the spirit and scope of this invention.

What I claim as new and desire to secure by Letters Patent of the United States is:

1. A supporting structure for a machine having a stationary member and a rotatable member, said stationary member including a frame having an outwardly extending portion with a bearing secured thereto, a shaft rotatably supported by said bearing and having an extension beyond one end thereof for supporting said rotatable member, a cover member secured to said outwardly extending portion and forming therewith a lubricant retaining cavity at the end of said bearing remote from said shaft extension, means including absorbent material extending into said cavity and contacting said shaft adjacent the end of said bearing remote from said cavity for feeding lubricant to said bearing, and means on said shaft for pumping lubricant from said feeding means along said shaft through said bearing from the end of said bearing adjacent said shaft extension toward said cavity whereby said lubricant is returned to said cavity.

2. A supporting structure for a machine having a stationary member and a rotatable member, said stationary member including a frame having an outwardly extending web portion with a bearing secured thereto, a shaft rotatably supported by said bearing and having an extension beyond one end thereof for supporting said rotatable member, a cover member secured to said web portion and forming therewith a lubricant retaining cavity at the end of said bearing remote from said shaft extension, means including absorbent material extending into said cavity and contacting said shaft adjacent the end of said bearing remote from said cavity for feeding lubricant to said bearing, said last-mentioned means including a portion extending along the outer surface of said bearing, and means on said shaft for pumping lubricant from said feeding means along said shaft through said bearing from the end of said bearing adjacent said shaft extension toward said cavity whereby said lubricant is returned to said cavity.

3. A supporting structure for a machine having a stationary member and a rotatable member, said stationary member including a frame having an outwardly extending web portion with a bearing secured thereto, a shaft rotatably supported by said bearing and having an extension beyond one end thereof for supporting said rotatable member, a cover member secured to said web portion and forming therewith a lubricant retaining cavity at the end of said bearing remote from said shaft extension, means including absorbent material extending into said cavity and contacting said shaft beyond the end of said bearing remote from said cavity for feeding lubricant to said bearing, and means including pumping grooves on said shaft for pumping lubricant from said feeding means along said shaft through said bearing from the end of said bearing adjacent said shaft extension toward said cavity whereby said lubricant is returned to said cavity.

4. A supporting structure for a machine having a stationary member and a rotatable member, said stationary member including a frame having an outwardly extending web portion with a bearing secured thereto, a shaft rotatably supported by said bearing and having an extension beyond one end thereof for supporting said rotatable member, a cover member secured to said web portion and forming therewith a lubricant retaining cavity at the end of said bearing remote from said shaft extension, said web portion having an opening therethrough communicating with said cavity, means including a wick of absorbent material extending into said cavity and contacting said shaft adjacent the end of said bearing remote from said cavity for feeding lubricant to said bearing, said wick extending through said opening in said web portion, and means on said shaft for pumping lubricant from said feeding means along said shaft through said bearing from the end of said bearing adjacent said shaft extension toward said cavity whereby said lubricant is returned to said cavity.

5. A supporting structure for a machine having a stationary member and a rotatable member, said stationary member including a frame having an outwardly extending web portion with a bearing secured thereto, a shaft rotatably supported by said bearing and having an extension beyond one end thereof for supporting said rotatable member, a cover member secured to said web portion and forming therewith a lubricant retaining cavity at the end of said bearing remote from said shaft extension, said web portion having an opening therethrough communicating with said cavity, means including a wick of absorbent material extending into said cavity and contacting said shaft adjacent the end of said bearing remote from said cavity for feeding lubricant to said bearing, said wick extending through said openings in said web portion and along the outer surface of said bearing, and means on said shaft for pumping lubricant from said feeding means along said shaft through said bearing from the end of said bearing adjacent said shaft extension toward said cavity whereby said lubricant is returned to said cavity.

6. A supporting structure for a machine having a stationary member and a rotatable member, said stationary member including a frame having an outwardly extending web portion with a bearing secured thereto, a shaft rotatably supported by said bearing and having an extension beyond one end thereof for supporting said rotatable member, a cover member secured to said web portion and forming therewith a lubricant retaining cavity at the end of said bearing remote from said shaft extension, said web portion having an opening therethrough communicating with said cavity, means including a wick of absorbent material extending into said cavity and contacting said shaft adjacent the end of said bearing remote from said cavity for feeding lubricant to said bearing, said wick extending through said openings in said web portion and along the outer surface of said bearing, and means including pumping grooves on said shaft for pumping lubricant from said feeding means along said shaft through said bearing from the end of said bearing adjacent said shaft extension toward said cavity whereby said lubricant is returned to said cavity.

7. A supporting structure for a machine having a stationary member and a rotatable member, said stationary member including a frame having an outwardly extending web portion with a bearing secured thereto, a shaft rotatably supported by said bearing and having an extension beyond one end thereof for supporting said rotatable member, a cover member secured to said web portion and forming therewith a lubricant retaining cavity at the end of said bearing remote from said shaft extension, means including a wick of absorbent material extending into said cavity and contacting said shaft adjacent the end of said bearing remote from said cavity for feeding lubricant to said bearing, means on said shaft for pumping lubricant from said feeding means along said shaft through said bearing from the end of said bearing adjacent said shaft extension toward said cavity whereby said lubricant is returned to said cavity, and absorbent material positioned in said cavity and in contact with said wick for holding said lubricant.

8. A supporting structure for a machine having a stationary member and a rotatable member, said stationary member including a frame having an outwardly extending web portion with a bearing secured thereto, a shaft rotatably supported by said bearing and having an extension beyond one end thereof for supporting said rotatable member, a cover member secured to said web portion and forming therewith a lubricant retaining cavity at the end of said bearing remote from said shaft extension, said web portion having an opening therein communicating with said cavity, means including a wick of absorbent material extending into said cavity and contacting said shaft extension for feeding lubricant to said bearing, said wick extending through said opening in said web, means on said shaft for pumping lubricant from said feeding means along said shaft through said bearing from the end of said bearing adjacent said shaft extension toward said cavity whereby said lubricant is returned to said cavity, and absorbent material positioned in said cavity and in contact with said wick for holding said lubricant.

9. A supporting structure for a machine having a stationary member and a rotatable member, said stationary member including a frame having an outwardly extending web portion with a bearing secured thereto, a shaft rotatably supported by said bearing and having an extension beyond one end thereof for supporting said rotatable member, a cover member secured to said web portion and forming therewith a lubricant retaining cavity at the end of said bearing remote from said shaft extension, said web portion having an opening therein communicating with said cavity, means including a wick of absorbent material extending into said cavity and contacting said shaft extension for feeding lubricant to said bearing, said wick extending through said opening in said web and along the outer surface of said bearing, means on said shaft for pumping lubricant from said feeding means along said shaft through said bearing from the end of said bearing adjacent said shaft extension toward said cavity whereby said lubricant is returned to said cavity, and absorbent material positioned in said cavity and in contact with said wick for holding said lubricant.

HARL C. BRADLEY.

REFERENCES CITED

The following references are of record in the file of this patent:

UNITED STATES PATENTS

| Number | Name | Date |
|---|---|---|
| 2,053,425 | Else | Sept. 8, 1936 |
| 2,193,713 | Cole | Mar. 12, 1940 |
| 2,306,743 | Morrill | Dec. 29, 1942 |